United States Patent [19]

Mouri et al.

[11] Patent Number: 4,909,343

[45] Date of Patent: Mar. 20, 1990

[54] ELECTRIC POWER STEERING SYSTEM

[75] Inventors: Toyohiko Mouri; Saiichiro Oshita; Tsutomu Takahashi; Mitsunori Ishii, all of Tokyo, Japan

[73] Assignee: Fuji Jukogyo Kabushiki Kaisha, Tokyo, Japan

[21] Appl. No.: 321,220

[22] Filed: Mar. 9, 1989

[30] Foreign Application Priority Data

Mar. 15, 1988 [JP] Japan .................. 63-61254

[51] Int. Cl.$^4$ ............................................. B62D 5/04
[52] U.S. Cl. .................... 180/142; 180/79.1; 180/146
[58] Field of Search ........... 180/79.1, 142, 146; 74/388 PS; 364/424.01

[56] References Cited

U.S. PATENT DOCUMENTS

| | | | |
|---|---|---|---|
| 4,703,821 | 11/1987 | Shimizu | 180/142 |
| 4,745,985 | 5/1988 | Nakayama et al. | 180/142 |
| 4,800,975 | 1/1989 | Oshita et al. | 180/79.1 |
| 4,834,203 | 5/1989 | Takahashi et al. | 180/79.1 |

Primary Examiner—Charles A. Marmor
Assistant Examiner—Donn McGiehan
Attorney, Agent, or Firm—Beveridge, DeGrandi & Weilacher

[57] ABSTRACT

A hydraulic power steering system is disclosed which has a steering control valve operatively connected to a steering shaft to be actuated by the torsional torque exerted thereon by a steering wheel, and a hydraulic cylinder operated by the control valve for assisting the steering of the vehicle. An electric motor drive unit is coupled to the steering shaft for exerting torque thereto in a direction for returning the steering wheel to a straight ahead position. An electronic control circuit is connected to the motor drive unit for exerting a variable amount of return torque to the steering shaft according to the steering angle of the steering shaft, or to both the steering angle and the travelling speed of the vehicle.

4 Claims, 2 Drawing Sheets

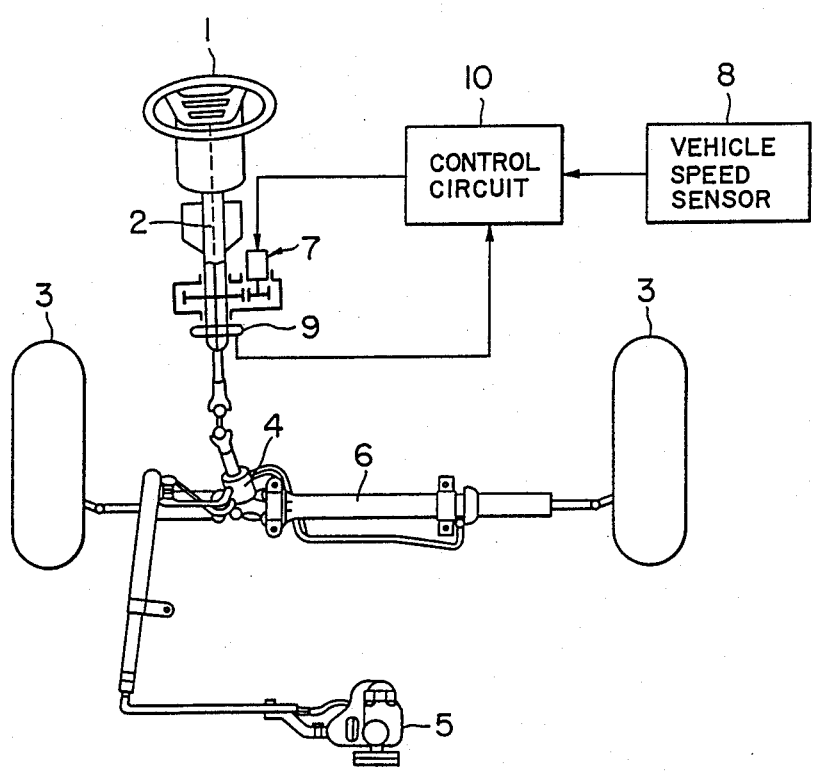
F I G. 1

ELECTRIC POWER STEERING SYSTEM

BACKGROUND OF THE INVENTION

The present invention relates to an electric power steering systems for a motor vehicles, and particularly to an electric power steering system having a system for automatic return of the steering wheel to the straight ahead position and other control functions.

There have been proposed and developed various kind of hydraulic power steering. A typical hydraulic power steering system comprises an engine driven pump, a flow control valve for controlling the flow rate of the hydraulic fluid delivered under pressure from the pump, a steering control valve, and an actuator having a hydraulic cylinder for steering the wheels of the vehicle by pressurized fluid through the steering control valve. Japanese Utility Model Publication No. 53-44181 discloses an example of such hydraulic power steering system.

Difficulties have been encountered in applying some additional steering control functions into the hydraulic power steering system of the above fundamental configuration. Such additional functions include the automatic return of the steering wheel to the straight ahead position when no turning effort is exerted thereon, and the control of the turning effort to be applied to the steering wheel in accordance with the traveling speed of the vehicle or to lateral acceleration. Conventionally, such additional change requires major modifications of the hydraulic piping and the addition of actuators and valves into the systems and results in large increase of the cost. The resulting steering systems have become much more complex and expensive than when no such additional means are included.

SUMMARY OF THE INVENTION

An object of the present invention is to provide various additional steering control functions into conventional power steering systems of hydraulic and other varieties by minor changes without larger alteration of the existing parts or components of the system.

According to the present invention, a power steering system of the type having torque sensor attached to a steering shaft for sensing torsional torque exerted thereon by a steering wheel, and assist power means for assisting the steering of the vehicle in accordance with the torsional torque on the steering shaft. An actuator is mounted on the steering shaft at a position closer to the steering wheel than that of the torque sensor. The actuator comprising an electric motor drive unit, turns the steering shaft in a direction for returning the steering wheel to a straight ahead position. Connected between the actuator and a steering angle sensor, which detects the steered angle, a control circuit actuates the actuator to return the steering shaft according to the steering angle of the steering shaft.

Alternatively, the control circuit also connects a vehicle speed sensor which detects the traveling speed of the vehicle. The control circuit controls the actuator according to both the steering angle and the vehicle speed.

Only by the addition of the actuator and the control circuit, automatic return to the straight ahead position become possible when the vehicle is both at rest and during travel.

Another aspect of the present invention is to provide the control circuit which can control the torque exerted by the actuator on the steering shaft according to the steering speed and/or to lateral acceleration, thereby providing optimum steering ability under any driving conditions.

The above and other features and advantages of this invention and the manner of realizing them will best be understood, from a study of the following description and appended claims, with reference to attached drawings showing a preferred embodiments of the invention.

BRIEF DESCRIPTION OF THE DRAWINGS

FIG. 1 is a diagrammatic illustration of a hydraulic power steering system embodying the principles of the invention;

DESCRIPTION OF THE PREFERRED EMBODIMENT

Figure 2:
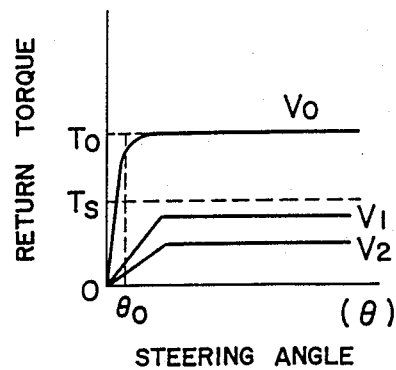
FIG. 2 is a graph showing relationship between the return torque exerted on the steering wheel and the steering angle in the power steering system of FIG. 1.

The present invention will now be described in detail as embodied in the hydraulic power steering system illustrated diagrammatically in FIG. 1. Seen at 1 in this figure is a steering wheel connected to a steering shaft 2 for steering a front wheels 3. The steering shaft 2 is rotatably connected to the front wheels 3 via a steering control valve 4 and a power cylinder 6. The control valve 4 serves as a torque sensor, being controllably actuated by the torsional torque applied to the steering shaft 2 by the steering wheel 1. So actuated, the control valve 4 provide hydraulic fluid from a pump 5 into chamber of the power cylinder 6.

The steering shaft 2 is additionally provided with an electric actuator 7, usually in the form of an electric motor drive unit complete with a speed reducer, in accordance with the invention. The actuator 7 controls amount of assist torque to the steering shaft 2. A control circuit 10 is connected to the actuator 7.

Connected to the control circuit 10 are a vehicle speed sensor 8 and a steering angle sensor 9. The steering angle sensor 9 is mounted to the steering shaft 2 for sensing rotation angle of the steering wheel 1 from the straight ahead position. The control circuit 10 controls the operation of the actuator 7, and therefore the torque applied to the steering shaft 2, according to the output signals of the vehicle speed sensor 8 and the steering angle sensor 9.

FIG. 2 shows the return torque as a function of the steering angle. The curve $V_o$ in this graph represents the torque applied to the steering shaft 2 by the actuator 7 in a direction for returning the steering wheel 1 to the straight ahead position, as the function of steering angle in either direction when the vehicle is at rest. It will be noted that the return torque increases in proportion to the steering angle $\theta$ when the steering wheel 1 is turned from its straight ahead position through a predetermined angle $\theta_o$. Then, as the steering angle exceeds this predetermined angle, the return torque levels off at a value $T_o$ that is higher than a value $T_s$ needed for turning the steering wheel when the actuator 7 is inactive. The control circuit 10 controls the actuator 7 to be energized in the required direction following the curve $V_o$.

Thus, as the driver releases the steering wheel 1 with the vehicle at rest, the steering control valve 4 actuates by the return torque $T_o$ exerted on the steering shaft 2. Thereupon the steering wheel returns to the straight ahead position or to its neighborhood. Parking the vehicle will become much easier than if the steering system were not equipped for such automatic return to the straight ahead position. At the time of the subsequent start of the vehicle, too, there will be no danger of its beginning to travel in an unexpected direction.

It has been stated that the constant return torque $T_o$ is set at a higher value than the torque $T_s$ needed for actuating the control valve 4. In hydraulic power steering systems in general, this torque $T_s$ is so small that the higher return torque $T_o$ to the steering shaft does not effect the manual turning of the steering wheel 1.

The curve $V_1$ in the graph of FIG. 2 indicates the return torque at various steering angles when the vehicle is traveling in middle and high speed ranges. In response to the output from the vehicle speed sensor 8 the control circuit 10 controls the actuator 7 so as to increase the return torque in proportion to the steering angle until the wheel 1 is turned than when the vehicle is at rest. Then the return torque becomes constant at greater steering angles, provided that the vehicle speed is constant.

Figure 3:
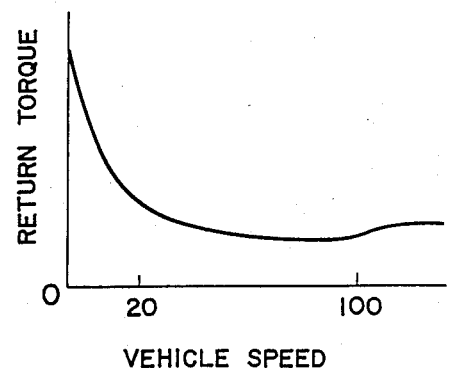
FIG. 3 is a graph showing relationship between the return torque and vehicle speed in the FIG. 1.

It is recommended that the return torque be varied with the vehicle speed at such greater steering angles as graphically represented in FIG. 3. This graph indicates that the return torque decreases with an increase in vehicle speed and then slightly increases in a high speed range (e.g. more than 100 kilometers per hour). The return torque characteristic during vehicle travel may be chosen at any value.

Figure 4:
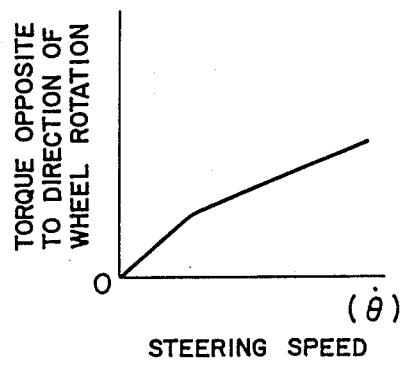
FIG. 4 is a graph showing relationship between the torque exerted on the steering wheel in a direction opposite to the direction of its rotation and the steering speed in the FIG. 1.

The control circuit 10 is equipped to prevent the hunting of the steering wheel near the straight ahead position. Toward this end, the control circuit 10 includes means for computing the steering speed from a range of change of the output signal of the steering angle sensor 9. The steering speed can be used for controlling the actuator 7 as graphically represented in FIG. 4. As the steering speed $\theta$ increases, the torque is increased in the direction opposite to that of steering wheel rotation in order to attenuate the return torque on the wheel. The actuator 7 can be controlled while returning of the steering wheel to the straight ahead position.

Figure 5:
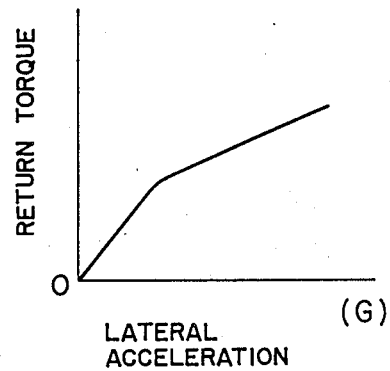
FIG. 5 is a graph showing relationship between the return torque and lateral acceleration in the FIG. 1.

Additionally, the control circuit 10 computes lateral acceleration from the output signals of the vehicle speed sensor 8 and the steering angle sensor 9. As will be understood from the graph of FIG. 5, the control circuit 10 controls the actuator 7 so that the return torque on the steering wheel 1 increases with an increase in the lateral acceleration G. Then the steering wheel 1 receives not only the return torque determined by the steering angle $\theta$, but also the return torque determined by the lateral acceleration G. The resultant of these return torques serves to prevent the excessive decreasing of the resistance of the wheel 1 as a function of the steering angle as a result of power assistance.

Although the present invention has been shown and described hereinbefore as applied to a hydraulic power steering system, it is applicable to electric power steering systems. Further the present invention is applicable not only to on-highway vehicles such as passenger cars, buses, trailers and trucks but also to off-highway vehicles such as forklift trucks and other construction and industrial vehicles.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A power steering system for a motor vehicle, the system being of the type having a torque sensor operatively connected to a steering shaft for sensing torsional torque exerted on the steering shaft by a steering wheel, and assist power means for assisting steering of the vehicle in accordance with the torsional torque on the steering shaft, wherein the improvement comprises:
    (a) an actuator mounted on the steering shaft for exerting torque thereto in a direction for returning the steering wheel to a straight ahead position, the actuator being positioned closer to the steering wheel than the torque sensor;
    (b) a steering angle sensor for sensing an angle through which the steering wheel is steered in either direction; and
    (c) a control circuit connected between the steering angle sensor and the actuator to exert return torque to the steering shaft according to the steering angle of the steering shaft.

2. The power steering system of claim 1 further comprising a vehicle speed sensor for sensing the vehicle, the control circuit being connected to the vehicle speed for controlling the actuator to vary the return torque exerted on the steering shaft according to the vehicle speed.

3. The power steering system of claim 2 wherein the control circuit computes lateral acceleration from the output signals of the steering angle sensor and the vehicle speed sensor and controls the actuator according to the lateral acceleration so as to change the return torque in proportion to the lateral acceleration.

4. The power steering system of claim 1 wherein the control circuit computes the speed at which the steering wheel is steered from the output signal of the steering angle sensor and controls the actuator according to the steering speed so as to change the return torque in inverse proportional to the steering speed.

* * * * *